(12) United States Patent
Goodman et al.

(10) Patent No.: US 12,671,733 B2
(45) Date of Patent: Jun. 30, 2026

(54) EDGE NETWORK PEER-TO-PEER ASSET DISTRIBUTION

(71) Applicant: Dell Products L.P., Round Rock, TX (US)

(72) Inventors: Bradley K. Goodman, Nashua, NH (US); Joseph Caisse, Burlington, MA (US); Eric Joseph Bruno, Shirley, NY (US); Daniel E. Cummins, Hudson, NH (US)

(73) Assignee: Dell Products L.P., Round Rock, TX (US)

( * ) Notice: Subject to any disclaimer, the term of this patent is extended or adjusted under 35 U.S.C. 154(b) by 107 days.

(21) Appl. No.: 18/678,169

(22) Filed: May 30, 2024

(65) Prior Publication Data

US 2025/0373685 A1 Dec. 4, 2025

(51) Int. Cl.
| | |
|---|---|
| *G06F 15/173* | (2006.01) |
| *H04L 41/0806* | (2022.01) |
| *H04L 67/06* | (2022.01) |
| *H04L 67/104* | (2022.01) |

(52) U.S. Cl.
CPC ........ *H04L 67/104* (2013.01); *H04L 41/0806* (2013.01); *H04L 67/06* (2013.01)

(58) Field of Classification Search
CPC .... H04L 67/104; H04L 41/0806; H04L 67/06
USPC ........................................................ 709/223
See application file for complete search history.

(56) References Cited

U.S. PATENT DOCUMENTS

| | | | | |
|---|---|---|---|---|
| 7,617,178 | B2 * | 11/2009 | Chavez | H04L 67/06 |
| 7,920,572 | B2 * | 4/2011 | Bates | H04L 67/104 |
| | | | | 370/395.5 |
| 8,078,729 | B2 * | 12/2011 | Kozat | H04L 65/612 |
| | | | | 707/967 |
| 8,095,630 | B1 * | 1/2012 | Schettino | G06F 9/4416 |
| | | | | 370/231 |
| 8,560,654 | B2 * | 10/2013 | Morgan | H04L 67/104 |
| | | | | 709/223 |
| 8,560,707 | B2 * | 10/2013 | Jacob | H04L 67/1051 |
| | | | | 709/228 |
| 8,626,876 | B1 * | 1/2014 | Kokal | H04N 21/2181 |
| | | | | 709/219 |
| 8,769,614 | B1 * | 7/2014 | Knox | H04L 65/612 |
| | | | | 726/3 |
| 9,009,272 | B2 * | 4/2015 | Kokal | H04L 67/06 |
| | | | | 709/219 |

(Continued)

*Primary Examiner* — Alicia Baturay
(74) *Attorney, Agent, or Firm* — WOMBLE BOND DICKINSON (US) LLP

(57) ABSTRACT

Methods and systems for managing an edge compute environment comprising endpoint devices and an orchestrator are disclosed. In particular, an internal peer-to-peer file sharing infrastructure exclusive to the edge compute environment is established using the endpoint devices and the orchestrator. The internal peer-to-peer file sharing infrastructure exclusive to the edge compute environment may then be used to retrieve and distribute data used for configuring one or more of the endpoint devices to allow the endpoint devices to provide one or more computer-implemented services to one or more users associated with the edge compute environment. For security of the endpoint devices, only the orchestrator is able to communicate with data processing systems external to the edge compute environment.

20 Claims, 9 Drawing Sheets

(56)                References Cited

U.S. PATENT DOCUMENTS

|  |  |  |  |  |
|---|---|---|---|---|
| 9,065,835 | B2 * | 6/2015 | Grigsby | H04L 67/568 |
| 9,485,238 | B2 * | 11/2016 | Knox | H04L 63/08 |
| 9,516,068 | B2 * | 12/2016 | Jacob | H04L 67/104 |
| 9,532,092 | B1 * | 12/2016 | Suryanarayanan | H04L 67/568 |
| 9,537,967 | B2 * | 1/2017 | Knox | H04N 21/2747 |
| 10,291,734 | B2 * | 5/2019 | Knox | H04N 21/2747 |
| 10,855,792 | B2 * | 12/2020 | Knox | H04L 67/02 |
| 10,931,746 | B2 * | 2/2021 | Scrivano | H04L 67/568 |
| 11,272,025 | B2 * | 3/2022 | Knox | H04L 67/02 |
| 2005/0229243 | A1 * | 10/2005 | Svendsen | H04L 67/104 |
|  |  |  |  | 726/12 |
| 2010/0169442 | A1 * | 7/2010 | Liu | H04L 67/1001 |
|  |  |  |  | 709/206 |
| 2010/0235432 | A1 * | 9/2010 | Trojer | H04L 67/1001 |
|  |  |  |  | 707/827 |
| 2013/0054691 | A1 * | 2/2013 | Calo | H04L 67/289 |
|  |  |  |  | 709/204 |

* cited by examiner

EDGE NETWORK PEER-TO-PEER ASSET DISTRIBUTION

FIELD

Embodiments disclosed herein relate generally to management of endpoint devices in edge compute environments. More particularly, embodiments disclosed herein relate to systems and methods to providing a secure environment for retrieval and distribution of assets between the endpoint devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
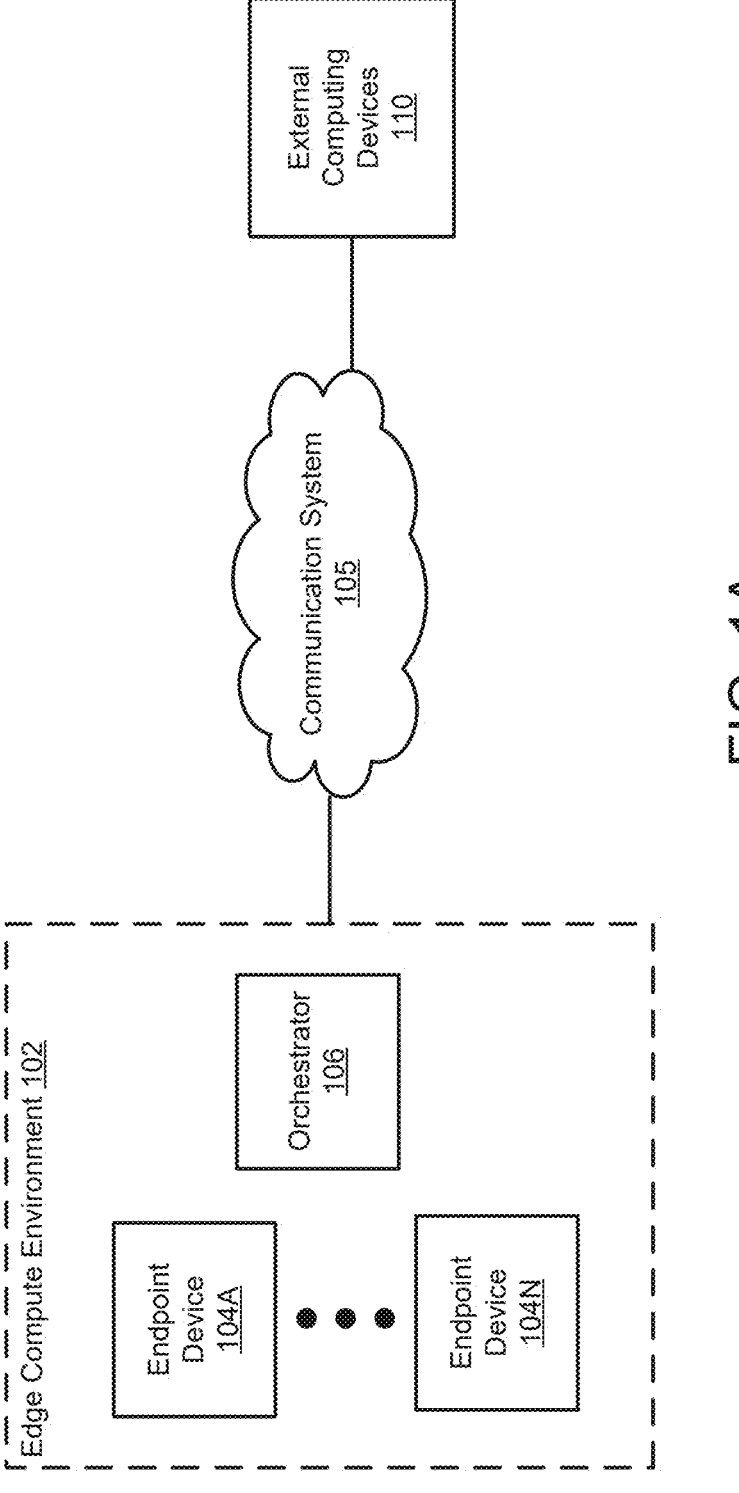
FIG. 1A shows a block diagram illustrating a system in accordance with one or more embodiments disclosed herein.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing edge compute environments. Such edge compute environments may host multiple edge endpoints (e.g., computing devices configured as endpoint devices) and may come in various topologies. For example, an edge compute environment be formed by a group of computing devices installed on a submarine, on a cruise ship, on a client site as a deployment, on a corporation or business's premises, or the like. The endpoint devices of an edge compute environment may usually be connected via a local area network (LAN) and may have limited connectivity to external networks for various reasons including connectivity availability, security, policies, etc.

For example, an edge compute environment may be a site that is air gapped, in that the endpoint devices may not have direct outside connectivity (e.g., connectivity to external devices via a communications network such as the Internet). Such site may be air gapped because each endpoint device may not have the necessary resources for protecting itself (e.g., from malware, viruses, malicious third-party attacks) should it be exposed to outside connectivity.

However, these endpoint devices need to be routinely configured (e.g., updated, re-booted, or the like) to provide up-to-date computer-implemented services to users of an edge compute environment. New endpoint devices deployed to an edge compute environment may also need to connect to an external source to retrieve configuration data (e.g., virtual machine (VM) images, operating system (OS) images and updates, application installation and update data, or the like). Thus, a method for efficiently and securely configure (without exposing these endpoint devices to external threats (e.g., threats external to the air gapped or semi-air gapped edge compute environment) these endpoint devices is required.

To overcome the above-discussed challenges and provide such an efficient and secure method for configuring these endpoint devices, an orchestrator may be provided to the edge compute environment to be the sole connection to the external environment of the edge compute environment. The orchestrator may be configured with sufficient computing resources to protect it from external threats, and may be configured as the sole point of contact for retrieving data used to configure the endpoint devices from other devices external to the edge compute environment.

Additionally, an internal peer-to-peer file sharing infrastructure exclusive to the edge compute environment may also be established using the endpoint device and the orchestrator of the edge compute environment. The peer-to-peer file sharing infrastructure may adopt a torrent protocol (e.g., a BitTorrent® protocol) for sharing data used to configure the endpoint devices between the endpoint devices. This would allow improved use of computing resources between the endpoint devices because each endpoint device would no longer have to store a complete copy of all of the configuration data needed to configure the device.

For example, assume that ten (10) endpoint devices within the edge compute environment all need the same application and that the application installation file takes up a hundred fifty (150) gigabytes (GB) of storage space (e.g., limited computing resources of the endpoint devices). Instead of having all 10 endpoint devices individually store the application installation file (e.g., use up 150 GB of storage space on all 10 devices), only one endpoint device may store the application installation file (or the application installation file may be split up into multiple smaller pieces and stored across a portion or all of the 10 endpoint devices and/or the orchestrator). Other endpoint devices that need to use the application installation file may then retrieve the application installation file using the torrent protocol (e.g., using a torrent file created for the application installation file) from the other endpoint devices and/or the orchestrator, use the file, and immediately delete the file after use.

As another example, assume that there are forty (40) endpoint devices in the edge compute environment that require ten (10) different types of data. None of the devices (e.g., endpoint devices and the orchestrator) may have enough resources to store all 10 different types of data. By implementing the peer-to-peer file sharing infrastructure of embodiments disclosed herein, the 10 different types of data may be stored separately across all of the devices of the edge compute environment (e.g., in a manner deemed most resource efficient by one or more users of the edge compute environment) and still be available for retrieval and use by all of the devices of the edge compute environment. In such a scenario, the orchestrator may be configured to keep track of the location and availability of all of the 10 different types of data.

Additionally, each endpoint device may be configured to include a proxy (also referred to herein as a "torrent proxy") to allow each endpoint device to use the peer-to-peer file sharing infrastructure without having to reconfigure all of the existing applications (and other software) already installed on the endpoint devices to be able to communicate using the torrent protocol.

As a result, an improved edge compute environment configuration may be obtained where not only are the limited computing resources of the endpoint devices are saved and used more efficiently but the endpoint devices are also secured and protected from external threats. For example, limited computing resources of the endpoint devices may now be re-directed for other uses (e.g., execution of applications, data processing for providing the computer-implemented services, or the like) rather than for security and storage.

Thus, embodiments disclosed herein not only directly improve the functionality (e.g., computer functionalities) of each of the endpoint devices within the edge compute environment but also provide improved security for these endpoint devices.

In an embodiment, a computer-implemented method for managing for managing an edge compute environment comprising endpoint devices and an orchestrator is provided. The computer-implemented method may include: establishing an internal peer-to-peer file sharing infrastructure exclusive to the edge compute environment using the endpoint devices and the orchestrator, the internal peer-to-peer file sharing infrastructure using a torrent protocol; and using the internal peer-to-peer file sharing infrastructure exclusive to the edge compute environment to configure one or more of the endpoint devices to allow the endpoint devices to provide one or more computer-implemented services to one or more users associated with the edge compute environment.

Each of the endpoint devices and the orchestrator are peers storing data being shared using the internal peer-to-peer file sharing infrastructure, and the data being torrent data associated with one or more torrent files.

The orchestrator comprises a torrent tracker that keeps track of data availability information associated with the data being shared using the internal peer-to-peer file sharing infrastructure.

4

Only the orchestrator is able to communicate with data processing systems external to the edge compute environment.

Within the internal peer-to-peer file sharing infrastructure exclusive to the edge compute environment, the orchestrator manages data retention instructions for the data being shared using the internal peer-to-peer file sharing infrastructure and causes one or more of the endpoint devices to execute one or more of the data retention instructions.

Using the internal peer-to-peer file sharing infrastructure exclusive to the edge compute environment to configure the endpoint devices may include, for a first endpoint device of the endpoint devices and by the first endpoint device: obtaining a first request for first data, the first data being for configuring the first endpoint device; making a first determination that a first torrent file associated with the first data exists within the edge compute environment; making a second determination, using the first torrent file and with the orchestrator, that the first data is available within the edge compute environment; in response to the second determination, downloading the first data using the first torrent file from within the edge compute environment without accessing any data processing systems outside of the edge compute environment; and using, after downloading the first data, the first data to configure the first endpoint device to obtain an updated first endpoint device that provides one or more computer-implemented services associated with the first data.

Using the internal peer-to-peer file sharing infrastructure exclusive to the edge compute environment to configure the endpoint devices may further include, for the first endpoint device and further by the first endpoint device: after downloading the first data, informing the orchestrator that the first endpoint device is storing a complete or partial copy of the first data such that the orchestrator is able to update data availability information specifying all data, for configuring the endpoint devices, available within the edge compute environment.

The first request is transmitted by an application hosted on the first endpoint device and is obtained and processed by a torrent proxy hosted by the first endpoint device.

Using the internal peer-to-peer file sharing infrastructure exclusive to the edge compute environment to configure the endpoint devices may further include, for a second endpoint device of the endpoint devices and by the second endpoint device: obtaining a second request for second data, the second data being for configuring the second endpoint device; making a third determination that a second torrent file associated with the first data does not exist within the edge compute environment; in response to the third determination, downloading the second data from a source external to the edge compute environment, wherein the second data is downloaded through the orchestrator; and using, after downloading the second data, the second data to configure the second endpoint device to obtain an updated second endpoint device that provides one or more computer-implemented services associated with the second data.

Using the internal peer-to-peer file sharing infrastructure exclusive to the edge compute environment to configure the endpoint devices may further include, for the second endpoint device and further by the second endpoint device: after downloading the second data, generating a second torrent file for the second data; and providing data availability information associated with the second data and a copy of the second torrent file to the orchestrator, the data availability information associated with the second data specifying that the second endpoint device retains a complete or partial copy of the second data.

A non-transitory media may include instructions that when executed by endpoint devices and an orchestrator of an edge compute environment cause the computer-implemented method to be performed.

An edge compute environment may include one or more endpoint devices and an orchestrator having the non-transitory media, and may perform the computer-implemented method when the computer instructions are executed by the one or more endpoint devices and the orchestrator.

Turning to FIG. 1A, a block diagram illustrating a system in accordance with an embodiment is shown. The system shown in FIG. 1A may provide computer-implemented services via one or more edge compute environments (e.g., edge compute environment 102). The system may include the edge compute environment 102 and external computing devices 110 (e.g., computing devices/data processing systems external to edge compute environment 102). The edge compute environment may include one or more endpoint devices 104A-104N and an orchestrator 106.

The computer-implemented services may include any type and quantity of services including, for example, database services, instant messaging services, video conferencing services, prediction and/or inference generation services, machine learning (ML)/artificial intelligence (AI) related services, data science related services, etc. Different systems may provide similar and/or different computer-implemented services. To provide the computer-implemented services, data processing systems 100A-100N may host applications and/or computer-implemented models (e.g., large language models (LLMs), generative artificial intelligent (AI) models, or the like) that provide these (and/or other) computer-implemented services. The applications and/or computer-implemented models may be hosted by one or more of data processing systems 100A-100N. For example, the applications may utilize (e.g., invoke use of, or the like) one or more backend components (e.g., the computer-implemented models, policies, backend applications, data and infrastructures, or the like) to provide the computer-implemented services.

Endpoint devices 104A-104N may include any number of computing devices (e.g., see computing device of FIG. 4) that provide the computer-implemented services. For example, endpoint devices 104A-104N may include one or more computing devices that may independently and/or cooperatively provide the computer-implemented services. For example, all, or a portion, of endpoint devices 104A-104N may provide computer-implemented services to users and/or other computing devices operably connected to endpoint devices 104A-104N.

Orchestrator 106 may be configured (e.g., as a control plane of the edge compute environment 102) to manage the endpoint devices 104A-104N. Orchestrator 106 may also be configured to be the sole point of contact between the edge compute environment 102 and the external computing devices 110 (e.g., using communication system 105, which is discussed in more detail below). Said another way, the endpoint devices 104A-104N may be completely air gapped from the environment outside of (e.g., external to) the edge compute environment 102 while only the orchestrator is able to communicate with devices and systems located external to the edge compute environment 102.

Furthermore, when providing their functionality, endpoint devices 104A-104N and/or orchestrator 106 may perform all, or a portion, of the method and/or actions shown in FIGS. 2A-3C.

In particular, to manage the endpoint devices 104A-104N within the edge compute environment 102, an internal peer-to-peer file sharing infrastructure exclusive to the edge compute environment 102 may be established using the endpoint devices 104A-104N and the orchestrator 106. The internal peer-to-peer file sharing infrastructure exclusive to the edge compute environment 102 may then be used to retrieve and distribute data used for configuring one or more of the endpoint devices 104A-104N to allow the endpoint devices 104A-104N to provide accurate and up-to-date computer-implemented services to one or more users associated with the edge compute environment 102.

For improved security of the endpoint devices 104A-104N, only the orchestrator is able to communicate with computing devices and data processing systems (e.g., the external computing devices 110) external to the edge compute environment 102.

In embodiments, the peer-to-peer file sharing infrastructure may adopt a torrent protocol (e.g., a BitTorrent® protocol) for sharing data used to configure the endpoint devices between the endpoint devices. This would allow improved use of computing resources between the endpoint devices 104A-104N because each endpoint device 104A-104N would no longer have to store a complete copy of all of the configuration data needed to configure the device.

For example, assume that ten (10) endpoint devices 104A-104N within the edge compute environment 102 all need the same application and that the application installation file takes up a hundred fifty (150) gigabytes (GB) of storage space (e.g., limited computing resources of the endpoint devices). Instead of having all 10 endpoint devices 104A-104N individually store the application installation file (e.g., use up 150 GB of storage space on all 10 devices), only one endpoint device (e.g., 104A) may store the application installation file (or the application installation file may be split up into multiple smaller pieces and stored across a portion or all of the 10 endpoint devices and/or the orchestrator). Other endpoint devices (e.g., 104B-104N) that need to use the application installation file may then retrieve the application installation file using the torrent protocol (e.g., using a torrent file created for the application installation file) from the other endpoint devices and/or the orchestrator 106, use the file, and immediately delete the file after use.

As another example, assume that there are forty (40) endpoint devices 104A-104N in the edge compute environment 102 that require ten (10) different types of data. None of the devices (e.g., endpoint devices 104A-104N and the orchestrator 106) may have enough computer resources to store all 10 different types of data. By implementing the peer-to-peer file sharing infrastructure of embodiments disclosed herein, the 10 different types of data may be stored separately across all of the devices of the edge compute environment 102 (e.g., in a manner deemed most resource efficient by one or more users of the edge compute environment) and still be available for retrieval and use by all of the devices of the edge compute environment 102. In such a scenario, the orchestrator 106 may be configured to keep track of the location and availability of all of the 10 different types of data.

Additionally, each endpoint device may be configured to include a proxy (also referred to herein as a "torrent proxy", which is discussed below in more detail in reference to FIG. 1B) to allow each endpoint device 104A-104N to use the peer-to-peer file sharing infrastructure without having to reconfigure all of the existing applications (and other software) already installed on the endpoint devices to be able to communicate using the torrent protocol.

As a result, an improved edge compute environment configuration may be obtained for the edge compute environment 102 where not only are the limited computing resources of the endpoint devices 104A-104N are saved and used more efficiently but the endpoint devices 104A-104N are also secured and protected from external threats. For example, limited computing resources of the endpoint devices 104A-104N may now me re-directed for other uses (e.g., execution of applications, data processing for providing the computer-implemented services, or the like) rather than for security and storage.

Thus, embodiments disclosed herein not only directly improve the functionality (e.g., computer functionalities) of each of the endpoint devices 104A-104N within the edge compute environment 102 but also provide improved security for these endpoint devices 104A-104N.

In embodiments, external computing devices 110 may include any kind and number of computing devices that are disposed external to the edge compute environment 102. Said another way, any or all computing devices that do not make up the edge compute environment 102 may be one of the external computing devices 110. To communicate with the edge compute environment 102, the external computing devices 110 must use communication system 105. For example, the external computing devices 110 may include a server maintained by a provider of the edge compute environment 102. The server may store configuration data (e.g., virtual machine (VM) images, operating system (OS) images and updates, application installation and update data, or the like) that may be used to maintain, deploy, and/or update the endpoint devices 104A-104N and the orchestrator 106.

Endpoint devices 104A-104N, orchestrator 106, and external computing devices 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 4. Within the edge compute environment 102, the endpoint devices 104A-104N and orchestrator 106 may be configured to communicate with one another using a local area network (LAN) that does not require connection to any external communication systems (e.g., the Internet, or the like).

Any of the components illustrated in FIG. 1A may be operably connected to each other (and/or components not illustrated) with a communication system 105. In an embodiment, communication system 105 may include one or more networks that facilitate communication between any number of components. The networks may include wired networks and/or wireless networks (e.g., and/or the Internet). The networks may operate in accordance with any number and types of communication protocols (e.g., such as the internet protocol).

In one example, only the orchestrator 106 may be directly connected (and be able to communicate with) to the external computing devices 110 via the communication system 105. Alternatively, in another example, some (e.g., one, or a couple of) the endpoint devices 104A-104N may also be provided with the ability to communicate directly with the external computing devices 110 via the communication system 105.

While illustrated in FIG. 1A as including a limited number of specific components, a system in accordance with an embodiment may include fewer, additional, and/or different components than those illustrated therein.

Figure 1B:
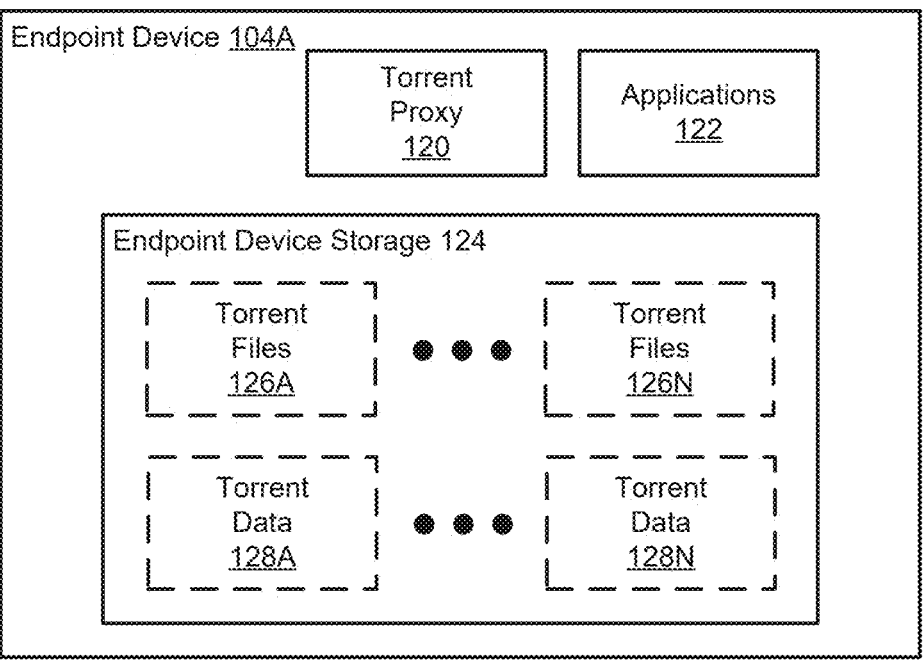
FIG. 1B shows a block diagram illustrating an example endpoint device in accordance with one or more embodiments disclosed herein.

Turning now to FIG. 1B, an example endpoint device 104A is shown. The example endpoint device 104A may include a torrent proxy 120, one or more applications 122, and an endpoint device storage 124. All other endpoint devices 104B-104B may also include these components shown in FIG. 1B. Each component of the example endpoint device 104A will be described below.

The torrent proxy 120 may be implemented using hardware, software, or a combination of both, and may be configured to intercept data requests from the applications 122. The torrent proxy 120 may also be configured to intercept any communications being transmitted to the applications 122. The torrent proxy 120 may be configured to execute a torrent protocol and a Hypertext Transfer Protocol (HTTP) protocol. The torrent protocol may be used to retrieve data (e.g., configuration data) using the internal peer-to-peer file sharing infrastructure exclusive to the edge compute environment (e.g., the edge compute environment in which endpoint device 104A is located). The HTTP protocol may be used to retrieve data (e.g., configuration data), either directly or through the orchestrator 106, from a source external to the edge compute environment (e.g., from one or more of the external computing devices 110).

In embodiments, rather than configure all applications (e.g., applications 122) and other software of the endpoint device 104A to be able to speak BitTorrent® (e.g., implement the torrent protocol), only the torrent proxy 120 may be configured with such capabilities/functions. The applications (other software) of the endpoint device 104A to use the HTTP protocol to retrieve data (e.g., send data retrieval requests using standard HTTP protocol). These requests may be intercepted and processed by the torrent proxy 120 to either retrieve the requested data using the torrent protocol or using the HTTP protocol. Details regarding the torrent proxy's 120 decision to use the torrent protocol or the HTTP protocol to retrieve the requested data will be discussed in more detail below in FIGS. 2A-3C.

The applications 122 may be any type of software applications installed/hosted within the endpoint device 104A that allows the endpoint device 104A to provide the one or more computer-implemented services discussed above. The applications 122 may utilize (e.g., invoke use of, or the like) one or more backend components (e.g., the computer-implemented models, policies, backend applications, data and infrastructures, or the like) (not shown) hosted by the endpoint device 104A to provide the computer-implemented services.

Endpoint device storage 124 may be implemented using any type and combination of storage devices and/or memory (e.g., hard disk drive (HDD), solid state drive (SSD), random access memory (RAM), or the like). Endpoint device storage 124 may be configured to store one or more torrent files 126A-126N and torrent data 128A-128N.

In embodiments, each of the torrent files 126A-126N may correspond to a single (or a group) of data (e.g., configuration data) used by the endpoint devices 104A-104N. The torrent files 126A-126N may be used by each of the endpoint devices 104A-104N to retrieve the data (e.g., as torrent data 128A-128N) using the torrent protocol (and through the torrent proxy 120). Each of the torrent data 128A-128N may contain all or a portion of the data (e.g., configuration data) used by the endpoint devices 104A-104N. For example, a torrent data 128A may contain an entirety of an OS image.

As another example, the OS image may be split into pieces and stored as multiple ones of the torrent data 128A-128N.

While illustrated in FIG. 1B as including a limited number of specific components, an example endpoint device 104A in accordance with an embodiment may include fewer, additional (e.g., hardware components such as a processor, graphics card, power supply, network adaptor, or the like), and/or different components than those illustrated therein.

Figure 1C:
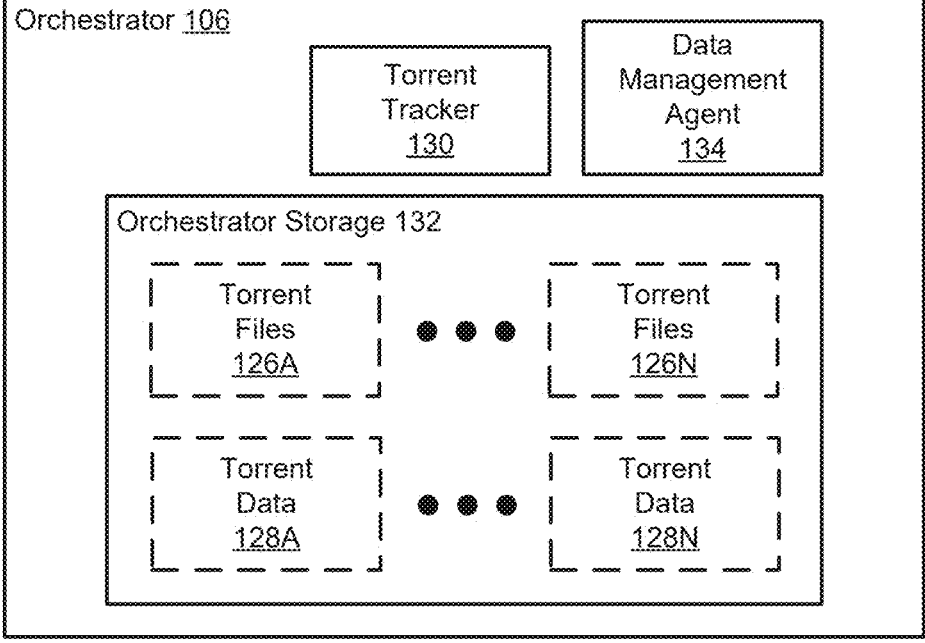
FIG. 1C shows a block diagram illustrating an example orchestrator in accordance with one or more embodiments disclosed herein.

Turning now to FIG. 1C, an example orchestrator 106 is shown. The example orchestrator 106 may include a torrent tracker 130, a data management agent 134, and an orchestrator storage 132. Each component of the orchestrator 106 will be described below.

The torrent tracker 130 may be implemented using hardware, software, or a combination of both, and may be configured to keep track of all of the torrent files 126A-126N and torrent data 128A-128N stored across the devices (e.g., the endpoint devices 104A-104N and orchestrator 106) of an edge compute environment (e.g., edge compute environment 102 of FIG. 1A). The torrent tracker 130 may also be configured to convey information of these data (e.g., the torrent files 126A-126N and torrent data 128A-128N) to any of the endpoint devices 104A-104N. Additionally, the torrent tracker 130 may be configured to receive and process torrent requests received from the endpoint devices 104A-104N (e.g., via the torrent proxy 120 of each of the endpoint devices 104A-104N). Additional details regarding the processing the torrent requests is discussed below in reference to FIGS. 2A-3C.

The data management agent 134 may be implemented using hardware, software, or a combination of both, and may be configured to manage a data retention policy (e.g., implement cache and file management procedures) for the devices (e.g., the endpoint devices 104A-104N and orchestrator 106) of the edge compute environment (e.g., edge compute environment 102 of FIG. 1A).

More specifically, the edge compute environment 102 may eventually reach a steady-state in which all endpoint devices 104A-104N are up-to-date (e.g., have retrieved and implemented all needed configuration data). During this steady-state, certain endpoint devices 104A-104N (and the orchestrator 106) may be holding on data (e.g., configuration data) that is no longer needed and no longer going to ever be used again. Instead of having each individual endpoint device 104A-104N manage the caching and retention of data, data management agent 134 of the orchestrator 106 may be configured to implement and execute these tasks.

To implement and execute such caching and data retention protocols for the entire edge compute environment, the data management agent 134 of the orchestrator 106 may be configured with one or more pre-defined data retention rules and/or policies (not shown). Each pre-defined data retention rules and/or policies may be generated by users (e.g., administrators) of the edge compute environment and may specify when data (e.g., configuration data) should be cleared from the devices (e.g., the endpoint devices 104A-104N and orchestrator 106) of the edge compute environment). More specifically, each these one or more pre-defined data retention rules and/or policies will specify at least one of: (i) what data needs to be kept/needs to exist; (ii) what data should be purged; (iii) what data should be retained; (iv) and how many copies of these data should be retained (e.g., a redundancy schema/protocol); or the like. Such pre-defined data retention rules and/or policies may also be received by the data management agent 134 of the orchestrator 106 in real time by one or more users of the orchestrator 106 (or of the edge compute environment).

In embodiments, the data management agent 134 may be implemented in the form of an application programming interface (API) that may: (i) allow the orchestrator 106 to delete (shared/cached) data from local storage (of the orchestrator 106 or of the endpoint devices 104A-104N) (e.g., API(s) that are able to provide/implement cache management policies and/or API(s) that allow users to prune/cleanup unused storage); (ii) allow the orchestrator 106 to proactively store data to any of the endpoint devices 104A-104N (e.g., allow the orchestrator to pre-stage data to one or more of the endpoint devices 104A-104N for later use/action); or the like.

To summarize, the data management agent 134 may be configured to allow the orchestrator to be the sole file management entity of the edge compute environment.

Similar to the endpoint device storage 124, the orchestrator storage 132 may be implemented using any type and combination of storage devices and/or memory (e.g., hard disk drive (HDD), solid state drive (SSD), random access memory (RAM), or the like). Orchestrator storage 132 may also be configured to store one or more torrent files 126A-126N and torrent data 128A-128N. Namely, the orchestrator 106 may also be a peer within the internal peer-to-peer file sharing infrastructure exclusive to the edge compute environment.

While illustrated in FIG. 1C as including a limited number of specific components, the orchestrator 106 in accordance with an embodiment may include fewer, additional (e.g., hardware components such as a processor, graphics card, power supply, network adaptor, or the like), and/or different components than those illustrated therein.

Figure 2A:
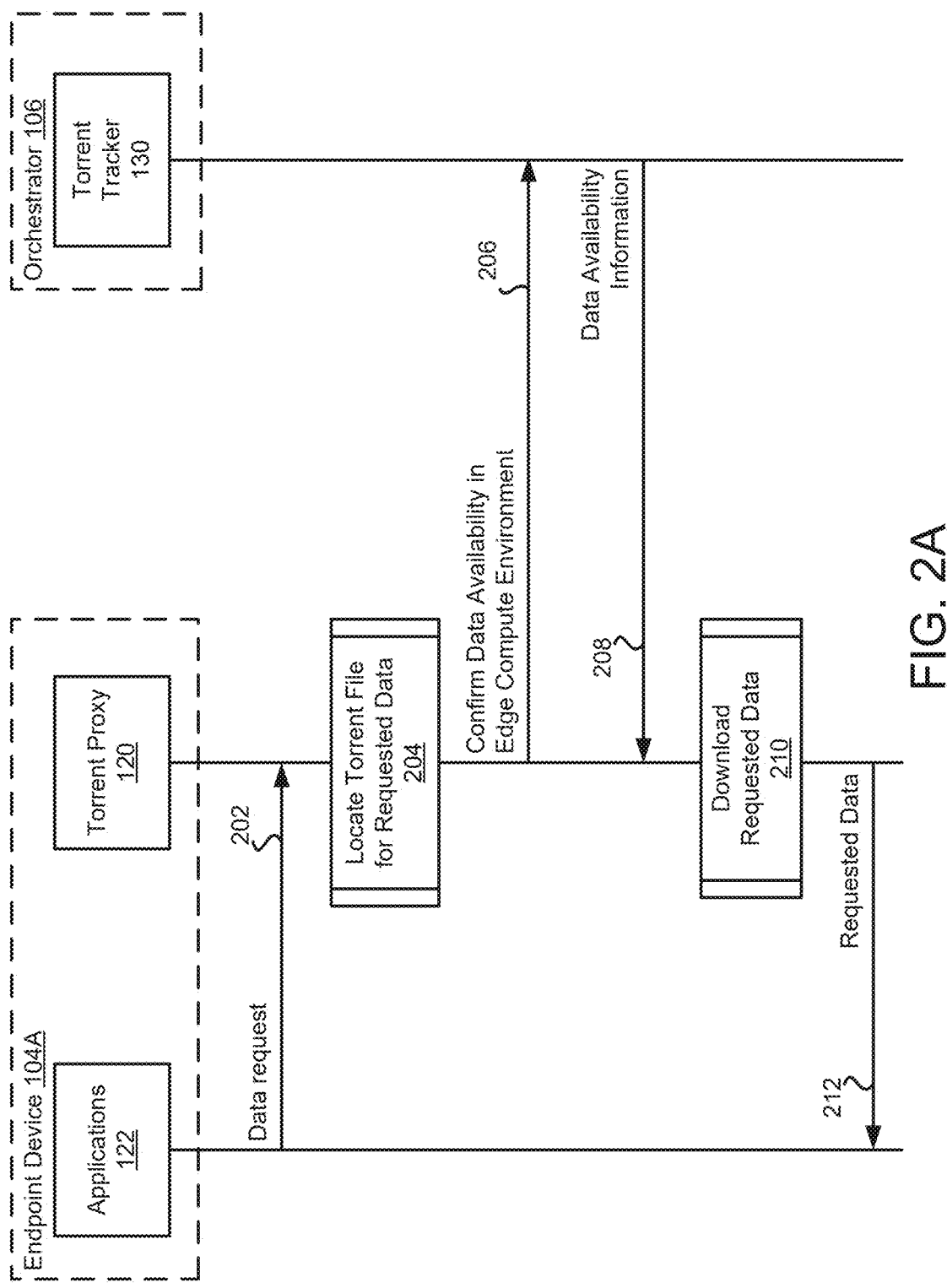
FIGS. 2A-2C show interaction diagrams in accordance with one or more embodiments disclosed herein.
Figure 2B:
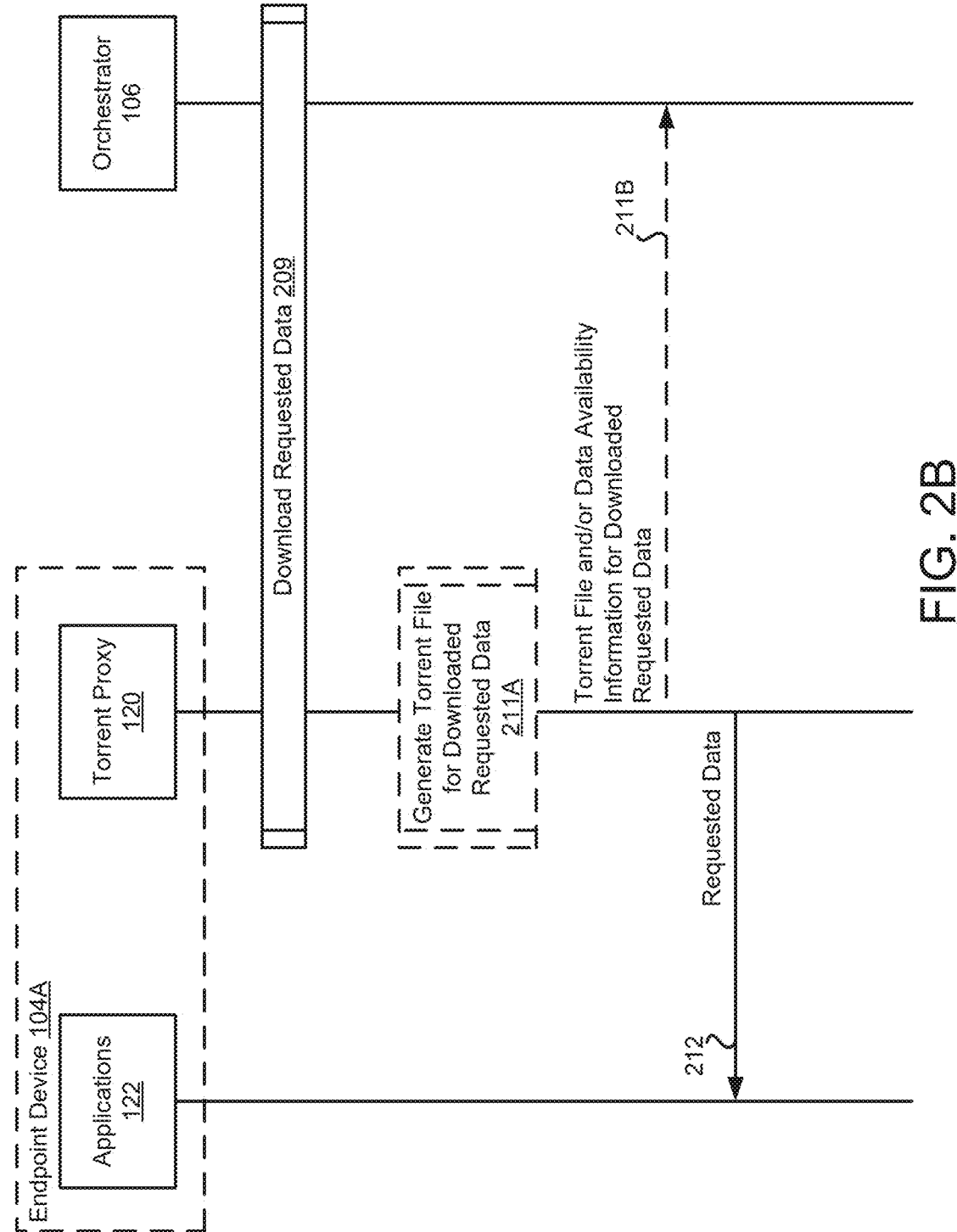
Figure 2C:
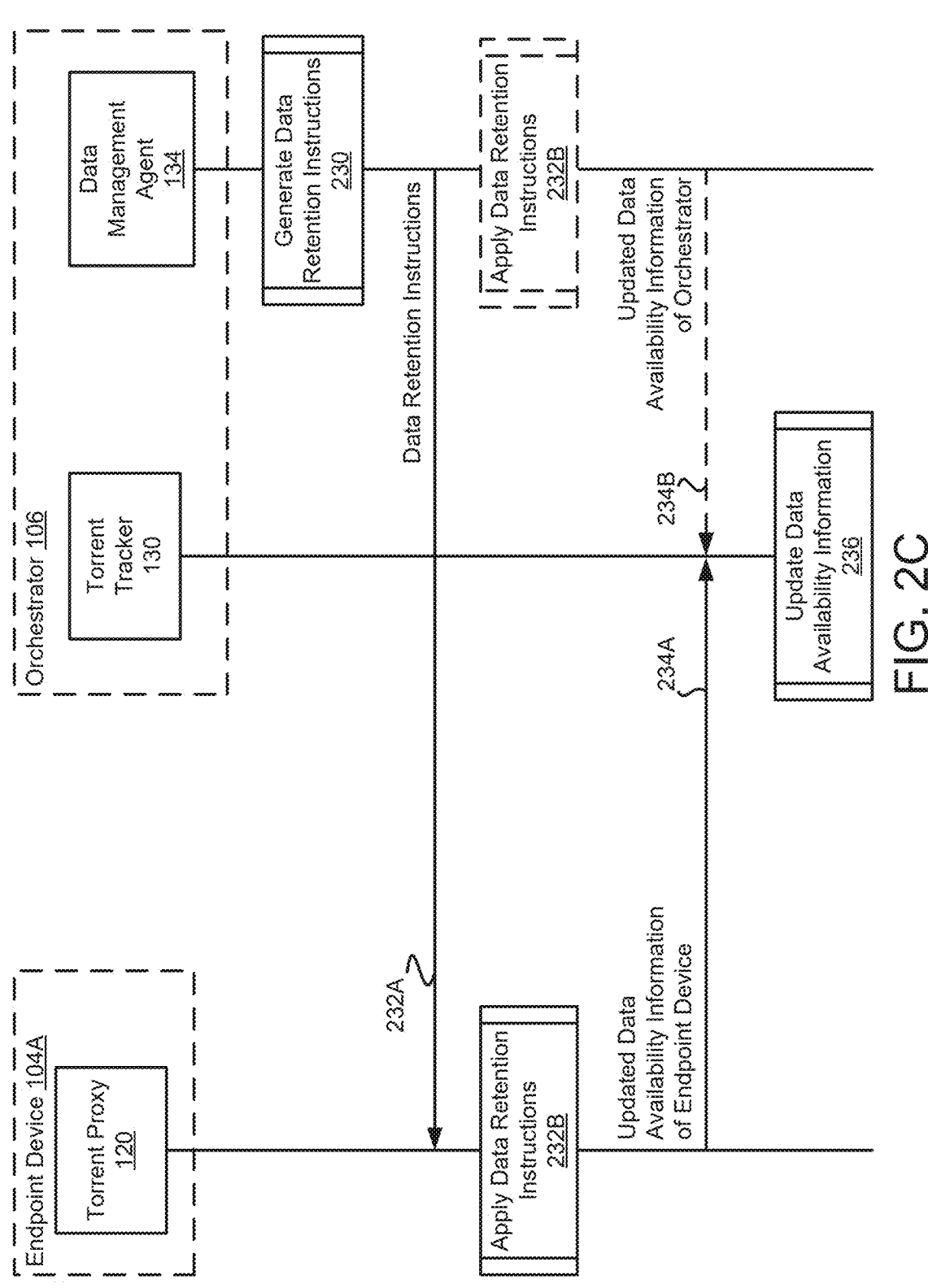

To further clarify embodiments disclosed herein, interaction diagrams in accordance with an embodiment are shown in FIGS. 2A-2C. In the interaction diagrams, processes performed by and interactions between components of a system in accordance with an embodiment are shown. In the diagrams, components of the system are illustrated using a first set of shapes (e.g., 122, 120, 130, 104A, 106, etc.), located towards the top of each figure. Solid lines descend from this first set of shapes to indicate that the devices are operating during the corresponding period of time. Interactions and processes shown using broken lines may be optional interactions and processes.

Processes performed by the components of the system are illustrated using a second set of shapes (e.g., 204, 210, etc.) superimposed over these lines. Interactions (e.g., communication, data transmissions, etc.) between the components of the system are illustrated using a third set of shapes (e.g., 202, 206, 208, 212, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 211A may occur prior to (or simultaneously with) the interaction labeled as 210. However, it will be appreciated that the processes and interactions may be performed in different orders, any may be omitted, and other processes or interactions may be performed without departing from embodiments disclosed herein.

Starting with FIG. 2A, a first interaction diagram in accordance with an embodiment is shown. The first interaction diagram may illustrate processes and interactions that may occur during management of the edge compute environment (e.g., edge compute environment 102 of FIG. 1A).

To obtain data (e.g., configuration data or the like including, but not limited to: (e.g., virtual machine (VM) images, operating system (OS) images and updates, application installation and update data, or the like), applications 122 of endpoint device 104A may, at interaction 202, send a data request (e.g., using standard HTTP protocol) to orchestrator 106. This data request from applications 122 may be intercepted by torrent proxy 120.

Torrent proxy 120, upon intercepting the data request from applications 122, may process the data request to determine whether the requested data may be downloaded via a torrent protocol (e.g., using the internal peer-to-peer file sharing infrastructure exclusive to the edge compute environment) or must be downloaded via an HTTP protocol from a source external to the edge compute environment. Additional details of this determination are discussed below in reference to FIG. 3B.

Assume here in FIG. 2A that the requested data exists as torrent data within the edge compute environment, the torrent proxy 120, upon intercepting the data request from applications 122 may attempt to locate the torrent file for the requested data in process 204. The torrent proxy 120 may attempt to locate the torrent file within the endpoint device storage 124 of the endpoint device 104A.

Once the torrent file for the requested data is located in the endpoint device storage 124 of the endpoint device 104A, at interaction 206, the torrent proxy 120 may (e.g., using the torrent protocol) send a request to the torrent tracker 130 of orchestrator 106 to confirm a data availability for the requested data in the edge compute environment. Said another way, the torrent proxy 120 confirms with torrent tracker 130 whether the torrent data associated with the torrent file actually exist within the edge compute environment (e.g., as being stored across one or more devices making up the edge compute environment including the endpoint devices 104A-104N and/or the orchestrator 106).

At interaction 208, upon confirming the data availability (e.g., using one or more data structures (e.g., logs, tables, lists, or the like) stored in the orchestrator 106), the torrent tracker 130, at interaction 208, transmits data availability information specifying that the torrent data is available within the edge compute environment to the torrent proxy. This data availability information may also specify where the torrent data (e.g., each piece of the torrent data) is stored across the devices making up the edge compute environment.

Upon receiving the data availability information from the torrent tracker, at process 210, the torrent proxy uses the data availability information to download the requested data (e.g., using the torrent protocol).

Once the requested data has been downloaded, at interaction 212, the torrent proxy provides the requested data to the one or more applications of applications 122 that requested the data. The applications 122 will then use the data obtained from the torrent proxy to configure the endpoint device 104A to provide one or more (new or updated) computer-implemented services.

Although not shown in FIG. 2A, at any point in time after the endpoint device 104A has obtained the requested data in process 210, the endpoint device 104A may be instructed by the orchestrator 106 (e.g., namely, the data management agent 134 of the orchestrator 106) to delete, retain, transfer as a whole to the orchestrator 106 and/or other endpoint devices 104B-104N for storage, split-up and send one or more portions of the split-up data to the orchestrator 106 and/or other endpoint devices 104B-104N, or the like, the requested data.

Turning now to FIG. 2B, FIG. 2B shows an interaction diagram illustrating a situation where torrent file(s) and/or torrent data does not exist for data requested by one or more of the applications 122. Said another way, the endpoint device 104A will have to retrieve the requested data (e.g., directly or via the orchestrator 106) from a source (e.g., from external computing devices 110) external to the edge compute environment 102.

In particular, in process 209 of FIG. 2B, the torrent proxy 120 may transmit a request (e.g., an HTTP request) to orchestrator 106. This request may include information (e.g., in the form of a uniform resource locator (URL), or the like) specifying where the requested data is located (e.g., stored) outside of the edge compute environment 102. The orchestrator 106 may then use this information to retrieve (e.g., download) the data from the external source and provide the retrieved data to the torrent proxy 120. Alternatively, if the endpoint device 104A is configured with external communication capabilities, the torrent proxy 120 will directly retrieve the data without going through the orchestrator 106.

Once the data is retrieved (e.g., downloaded), at process 211A, the torrent proxy 211A may generate a torrent file (and respective torrent data) for the downloaded data. The torrent file and/or torrent data generated at process 211A may be made available (e.g., as data availability information), at interaction 211B) to the orchestrator 106 (namely, to the torrent tracker 130 of the orchestrator 106). As a result, the downloaded data is now going to be made available (e.g., via orchestrator 106) to all other endpoint devices 104B-104N with applications (e.g., applications 122) that may also need the downloaded data.

Although not shown in FIG. 2B, at any point in time after the torrent data is generated, the endpoint device 104A may be instructed by the orchestrator 106 (e.g., namely, the data management agent 134 of the orchestrator 106) to delete, retain, transfer as a whole to the orchestrator 106 and/or other endpoint devices 104B-104N for storage, split-up and send one or more portions of the split-up data to the orchestrator 106 and/or other endpoint devices 104B-104N, or the like, the downloaded data.

At interaction 212 (similar to interaction 212 discussed above in reference to FIG. 2A), the requested data (that is downloaded in process 210) is provided by the torrent proxy 120 to the applications 122 (e.g., the applications 122 that requested the data via a data request similar to interaction 202 of FIG. 2A).

Turning now to FIG. 2C, FIG. 2C shows an interaction diagram illustrating a cache and file management process of one or more embodiments. In particular, at process 230, the data management agent 134 generates data retention instructions. As discussed above in reference to FIG. 1C, the data retention instructions may be generated using pre-defined data retention rules and/or policies stored in the orchestrator. The data retention instructions may also be generated based on real time instructions received from one or more users of the orchestrator 106. In embodiments, based on the pre-defined data retention rules and/or policies the data retention instructions may be generated at pre-defined intervals, times, or the like by the orchestrator 106.

At interaction 232A, the data retention instructions are transmitted to (e.g., intercepted by) torrent proxy 120 of endpoint device 104A where the data retention instructions are applied (in process 232B) by the torrent proxy 120. In embodiments, more than one of the endpoint devices 104A-104N may receive the same data retention instruction(s) at a given time.

At process 232B, the data management agent 134 may also cause the orchestrator 106 to apply the same data retention instructions that were provided to the endpoint devices 104A-104N.

In response to execution/implementation of process 232B by the endpoint device 104A and/or the orchestrator 106, the endpoint device 104A and/or the orchestrator may, at interactions 234A and 234B, respectively, provide updated data availability information to the torrent tracker 130. Upon receiving the updated data availability information, the torrent tracker 130 of the orchestrator 106 updates (in process 236) the data availability information that it is storing (e.g., in the form of a data structure, repository, or the like). This advantageously allows the torrent tracker 130 to always be up-to-date with regard to the availability of data (e.g., configuration data in the form of torrent files and/or torrent data) within the edge compute environment.

In embodiments, any of the interactions and/or processes illustrated above in FIGS. 2A-2C using the second and third set of shapes, respectively, may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Additionally, any of the interactions and/or processes illustrated above in FIGS. 2A-2C using the second and third set of shapes, respectively, may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Figure 3A:
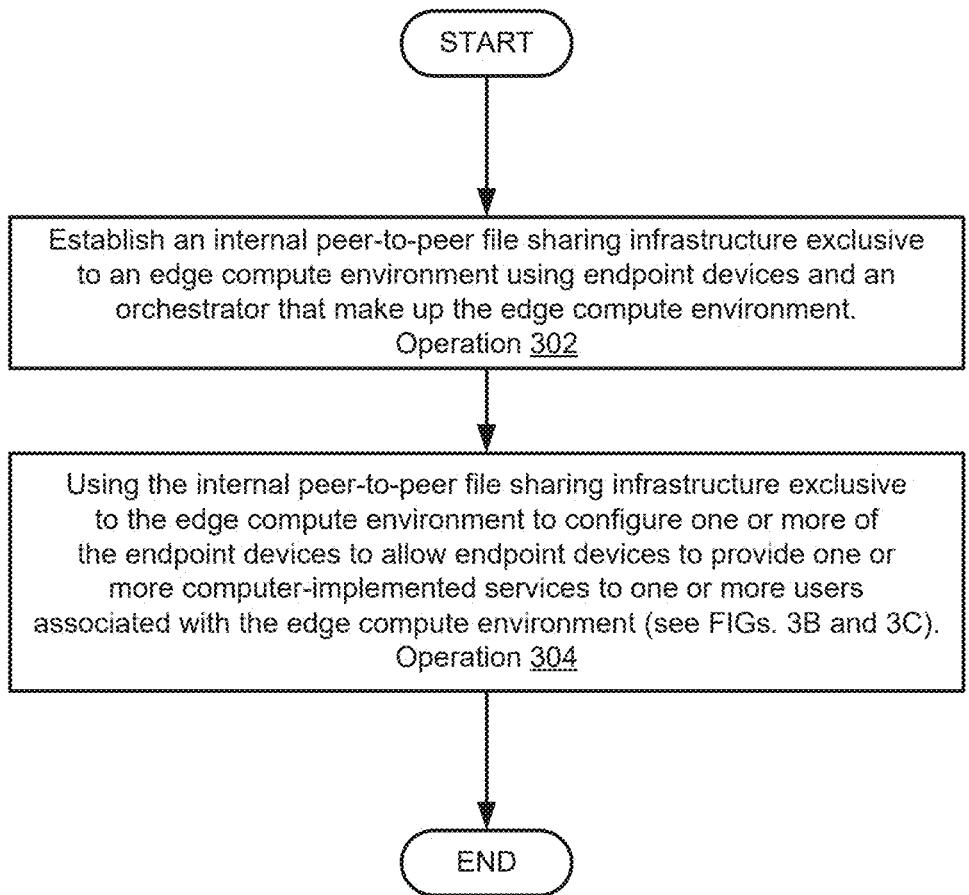
FIGS. 3A-3C show flow diagrams in accordance with one or more embodiments disclosed herein.
Figure 3B:
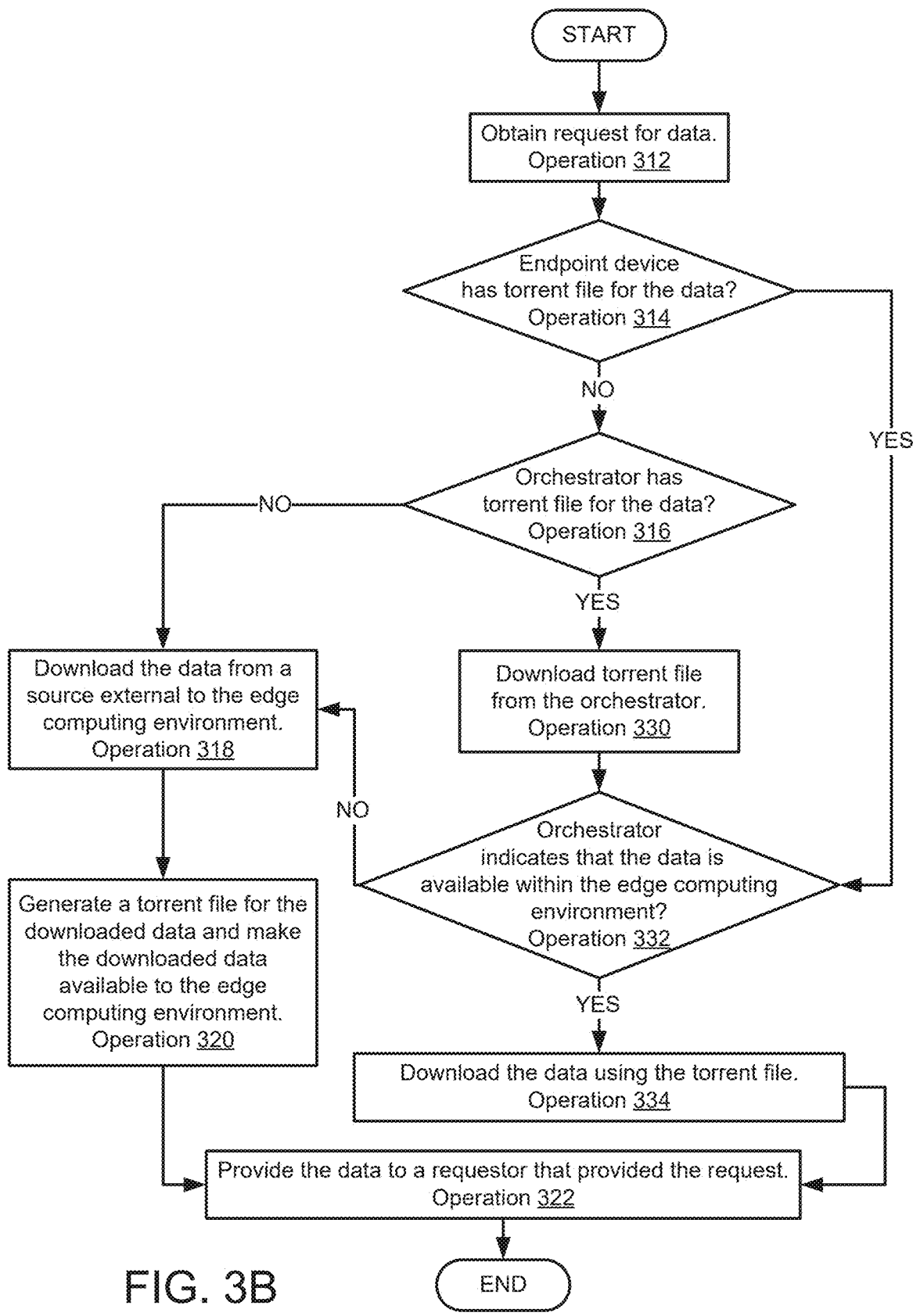
Figure 3C:
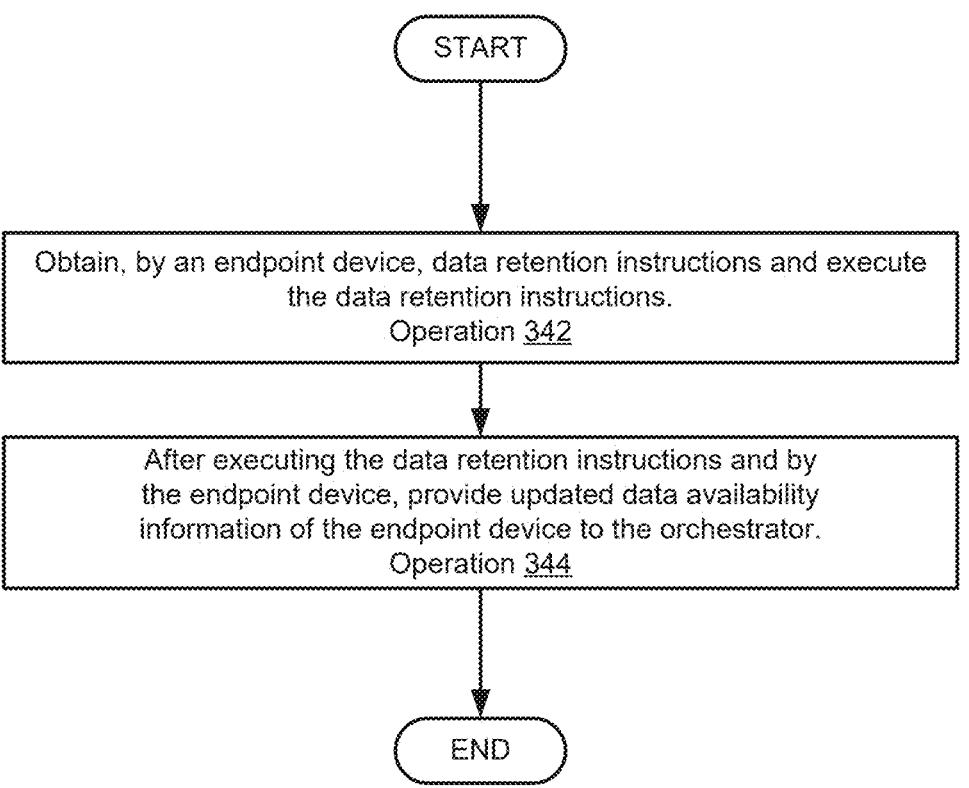

Turning now to FIGS. 3A-3C, flow diagrams illustrating methods for managing an edge compute environment comprising endpoint devices and an orchestrator are shown. The methods may be performed, for example, by any of the components of the system of FIG. 1A, and/or other components not shown therein.

Starting with FIG. 3A, at operation 302, as discussed above in reference to FIGS. 1A-2C, an internal peer-to-peer file sharing infrastructure exclusive to an edge compute environment (e.g., edge compute environment 102 of FIG. 1A) may be established using endpoint devices (e.g., endpoint devices 104A-104N of FIG. 1A) and an orchestrator (e.g., orchestrator 106 of FIG. 1A) that make up the edge compute environment.

In embodiments, the internal peer-to-peer file sharing infrastructure may be configured to implement a torrent protocol where all of the devices that make up the edge compute environment are peers of the peer-to-peer file sharing infrastructure. The internal peer-to-peer file sharing infrastructure is exclusive to (e.g., only available to) the devices making up the edge compute environment (e.g., not available/accessible to devices external to the edge compute environment).

At operation 304, as discussed above in reference to FIGS. 1A-2C, the internal peer-to-peer file sharing infrastructure exclusive to the edge compute environment may be used to configure one or more of the endpoint devices to allow the endpoint devices to provide one or more (new or updated) computer-implemented services to one or more users associated with the edge compute environment. Processes making up this operation will be discussed in more detail below in reference to FIGS. 3B and 3C.

The process of FIG. 3A may end following operation 304.

Turning now to FIG. 3B, FIG. 3B shows a flow diagram illustrating operations executed by a torrent proxy (e.g., torrent proxy 120 shown in FIG. 1B) of an endpoint device to retrieve data (e.g., configuration data or the like) for one or more applications (e.g., applications 122) of the endpoint device.

In operation 312, the obtained (e.g., intercepts) a request for data transmitted by one or more of the applications. The request for data may include any and all information that would help the torrent proxy identify and retrieve the data (e.g., including the name or other identification of the data, information (e.g., a URL) regarding where the data can be retrieved from externally to edge compute environment, or the like).

In operation 314, the torrent proxy makes a determination as to whether the endpoint device has a torrent file (e.g., as stored in endpoint device storage 124 (see FIG. 1B) of the endpoint device) associated with the data being requested. For example, the torrent file may include the same name or identification of the data included in the request.

If the torrent proxy determines that the endpoint device itself does not have the torrent file for the data (i.e., a determination of NO in operation 314), the torrent proxy will communicate with the orchestrator (namely, with torrent tracker 130 (see FIG. 1C) of the orchestrator) to determine (in operation 316) whether the orchestrator has access to the torrent file of the data (e.g., stored in the orchestrator storage 132 (see FIG. 1C) of the orchestrator and/or stored in any of the other endpoint devices of the edge compute environment).

If the orchestrator also does not have the torrent file for the data (e.g., the torrent proxy receives a negative confirmation from the torrent tracker of the orchestrator in operation 316), the torrent proxy proceeds to operation 318 where the torrent proxy will (directly or through the orchestrator, as discussed above in reference to FIG. 2B) retrieve (e.g., download, or the like) the data from a source external to the edge compute environment (e.g., via an HTTP request).

Once the data is retrieved, at operation 320 and as discussed above in reference to FIG. 2B, the torrent proxy may generate a torrent file (and associated torrent data) for the retrieved/downloaded data and make the data available to the edge compute environment (e.g., by transmitting the generated torrent file to the torrent tracker of the orchestrator along with data availability information specifying that this particular endpoint device is storing (a complete copy or a portion of) the downloaded/retrieved data).

At operation 322, the downloaded/retrieved data from operation 318 is provided (as discussed above in reference to FIGS. 2A-2B) to the requestor that provided the request (e.g., the one or more applications that requested the data).

The process of FIG. 3B may end following operation 322. Alternatively, turning back to operation 314, if the torrent proxy determines that the endpoint device itself does have the torrent file for the data (i.e., a determination of YES in operation 314), the torrent proxy will communicate (in operation 332) with the torrent tracker of the orchestrator to determine where the torrent data associated with the torrent file is located (e.g., stored) within the edge compute system.

During operation 332, the torrent tracker of the orchestrator may indicate to the torrent proxy of the endpoint device that the torrent data associated with the torrent file is not available (e.g., does not exist, is no longer stored, or the like) within the edge compute environment (i.e., a negative confirmation of NO in operation 332). As a result, the method may proceed to operation 318 discussed above where the requested data must be retrieved from the source external to the edge compute environment.

Alternatively, during operation 332, the torrent tracker of the orchestrator may indicate to the torrent proxy of the endpoint device that the torrent data associated with the torrent file is available (e.g., does exist, is still stored, or the like) within the edge compute environment (i.e., a positive confirmation of YES in operation 332). As a result, the method may proceed to operation 334 where, as discussed above in reference to FIG. 2A, the torrent proxy will download the data using the torrent file and using data availability information received from the torrent tracker that specifies a location of each piece (whole or in part) of the torrent data.

Once the torrent proxy downloads the requested data using the torrent file, the downloaded data is provided to (as discussed above in reference to FIGS. 2A-2B) to the requestor that provided the request (e.g., the one or more applications that requested the data) in operation 322.

The process of FIG. 3B may end following operation 322. Alternatively, turning back to operation 316, if the orchestrator does have the torrent file for the data (e.g., the torrent proxy receives a positive confirmation from the torrent tracker of the orchestrator in operation 316), the torrent proxy may obtain (e.g., via downloading, retrieving, receiving, or the like) the torrent file from the orchestrator (namely, the torrent tracker) in operation 330. Once the torrent file is obtained by the torrent proxy, the method proceeds to above-discussed operation 332 and progresses until operation 322 is completed, at which the process of FIG. 3B may end.

Turning now to FIG. 3C, FIG. 3C shows a flow diagram illustrating operations for implementing/executing cache and file management operations within the edge compute environment.

In particular, in operation 342, as discussed above in reference to FIG. 2C, an endpoint device may obtain one or more data retention instructions from an orchestrator (namely, from data management agent 134 (see FIG. 1C) of the orchestrator and execute the data retention instructions.

In operation 344, after executing the data retention instructions and as discussed above in reference to FIG. 2C, the endpoint device may provide updated data availability information of the endpoint device to the orchestrator (namely, the torrent tracker of the orchestrator.

This advantageously allows the torrent tracker to always be up-to-date with regard to the availability of data (e.g., configuration data in the form of torrent files and/or torrent data) within the edge compute environment.

The process of FIG. 3C may end following operation 344.

Figure 4:
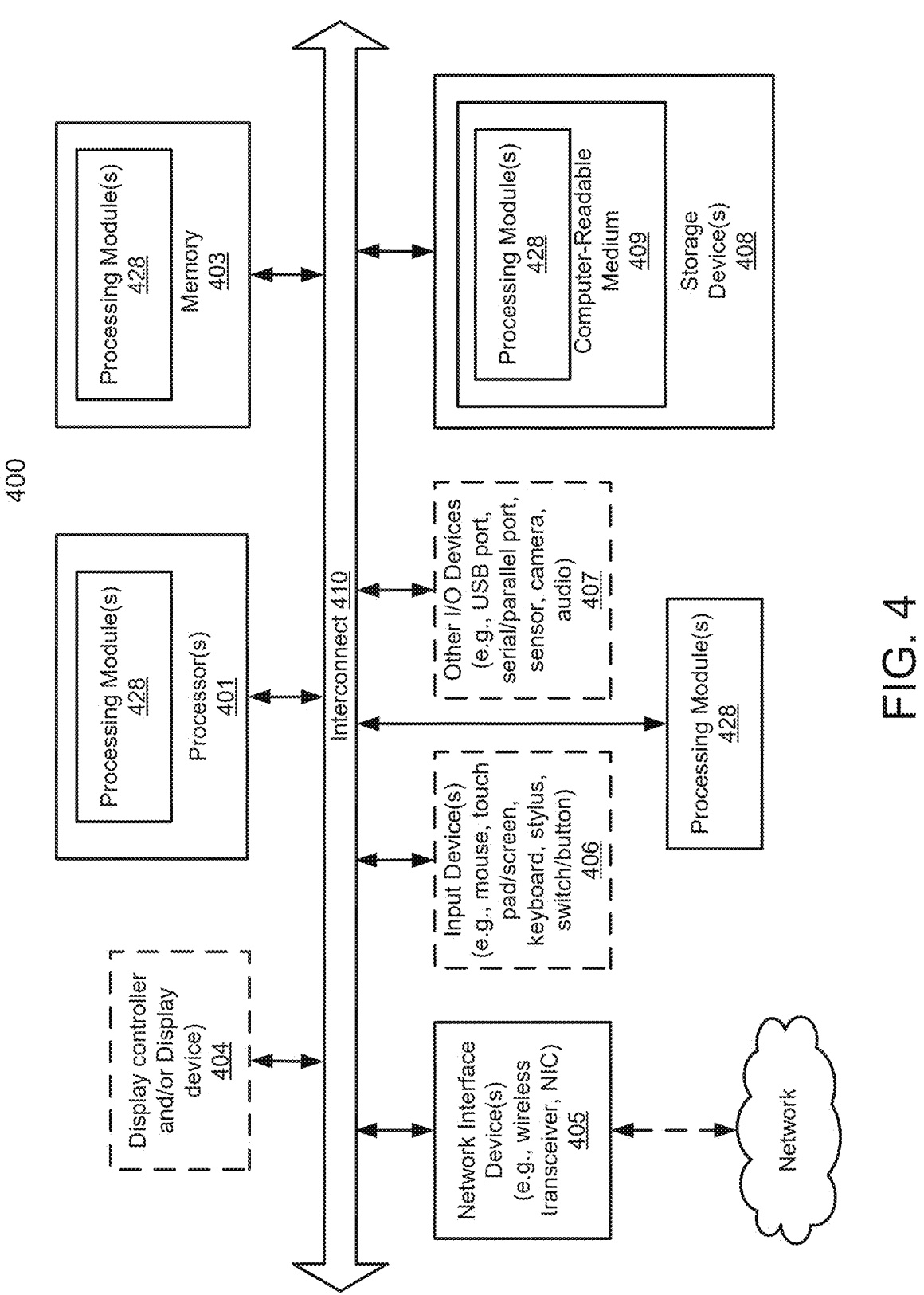
FIG. 4 shows a block diagram illustrating a data processing system in accordance with one or more embodiments disclosed herein.

Any of the components illustrated in FIGS. 1A-3C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like.

More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing an edge compute environment comprising endpoint devices and an orchestrator, the method comprising:

establishing an internal peer-to-peer file sharing infrastructure exclusive to the edge compute environment using the endpoint devices and the orchestrator, the internal peer-to-peer file sharing infrastructure using a torrent protocol, wherein the endpoint devices are air gapped from data processing systems external to the edge compute environment; and using the internal peer-to-peer file sharing infrastructure exclusive to the edge compute environment to configure one or more of the endpoint devices to allow the endpoint devices to provide one or more computer-implemented services to one or more users associated with the edge compute environment.

2. The method of claim 1, wherein each of the endpoint devices and the orchestrator are peers storing data being shared using the internal peer-to-peer file sharing infrastructure, and the data being torrent data associated with one or more torrent files.

3. The method of claim 2, wherein the orchestrator comprises a torrent tracker that keeps track of data availability information associated with the data being shared using the internal peer-to-peer file sharing infrastructure.

4. The method of claim 3, wherein only the orchestrator is able to communicate with the data processing systems external to the edge compute environment.

5. The method of claim 4, wherein, within the internal peer-to-peer file sharing infrastructure exclusive to the edge compute environment, the orchestrator manages data retention instructions for the data being shared using the internal peer-to-peer file sharing infrastructure and causes one or more of the endpoint devices to execute one or more of the data retention instructions.

6. The method of claim 1, wherein using the internal peer-to-peer file sharing infrastructure exclusive to the edge compute environment to configure the endpoint devices comprises, for a first endpoint device of the endpoint devices and by the first endpoint device:

obtaining a first request for first data, the first data being for configuring the first endpoint device;

making a first determination that a first torrent file associated with the first data exists within the edge compute environment;

making a second determination, using the first torrent file and with the orchestrator, that the first data is available within the edge compute environment;

in response to the second determination, downloading the first data using the first torrent file from within the edge compute environment without accessing any data processing systems outside of the edge compute environment; and using, after downloading the first data, the first data to configure the first endpoint device to obtain an updated first endpoint device that provides one or more computer-implemented services associated with the first data.

7. The method of claim 6, wherein using the internal peer-to-peer file sharing infrastructure exclusive to the edge compute environment to configure the endpoint devices further comprises, for the first endpoint device and further by the first endpoint device:

after downloading the first data, informing the orchestrator that the first endpoint device is storing a complete or partial copy of the first data such that the orchestrator is able to update data availability information specifying all data, for configuring the endpoint devices, available within the edge compute environment.

8. The method of claim 7, wherein the first request is transmitted by an application hosted on the first endpoint device and is obtained and processed by a torrent proxy hosted by the first endpoint device.

9. The method of claim 6, wherein using the internal peer-to-peer file sharing infrastructure exclusive to the edge compute environment to configure the endpoint devices further comprises, for a second endpoint device of the endpoint devices and by the second endpoint device:

obtaining a second request for second data, the second data being for configuring the second endpoint device;

making a third determination that a second torrent file associated with the first data does not exist within the edge compute environment;

in response to the third determination, downloading the second data from a source external to the edge compute environment, wherein the second data is downloaded through the orchestrator; and using, after downloading the second data, the second data to configure the second endpoint device to obtain an updated second endpoint device that provides one or more computer-implemented services associated with the second data.

10. The method of claim 9, wherein using the internal peer-to-peer file sharing infrastructure exclusive to the edge compute environment to configure the endpoint devices further comprises, for the second endpoint device and further by the second endpoint device:

after downloading the second data, generating a second torrent file for the second data; and providing data availability information associated with the second data and a copy of the second torrent file to the orchestrator, the data availability information associated with the second data specifying that the second endpoint device retains a complete or partial copy of the second data.

11. A non-transitory machine-readable medium having instructions stored therein, which when executed by endpoint devices and an orchestrator of an edge compute environment, cause the endpoint devices and the orchestrator to perform operations comprising:

establishing an internal peer-to-peer file sharing infrastructure exclusive to the edge compute environment using the endpoint devices and the orchestrator, the internal peer-to-peer file sharing infrastructure using a torrent protocol, wherein the endpoint devices are air gapped from data processing systems external to the edge compute environment; and using the internal peer-to-peer file sharing infrastructure exclusive to the edge compute environment to configure one or more of the endpoint devices to allow the endpoint devices to provide one or more computer-implemented services to one or more users associated with the edge compute environment.

12. The non-transitory machine-readable medium of claim 11, wherein each of the endpoint devices and the orchestrator are peers storing data being shared using the internal peer-to-peer file sharing infrastructure, and the data being torrent data associated with one or more torrent files.

13. The non-transitory machine-readable medium of claim 12, wherein the orchestrator comprises a torrent tracker that keeps track of data availability information associated with the data being shared using the internal peer-to-peer file sharing infrastructure.

14. The non-transitory machine-readable medium of claim 13, wherein only the orchestrator is able to communicate with the data processing systems external to the edge compute environment.

15. The non-transitory machine-readable medium of claim 14, wherein, within the internal peer-to-peer file sharing infrastructure exclusive to the edge compute environment, the orchestrator manages data retention instructions for the data being shared using the internal peer-to-peer file sharing infrastructure and causes one or more of the endpoint devices to execute one or more of the data retention instructions.

16. An edge compute environment comprising:

one or more endpoint devices; and an orchestrator, wherein each of the one or more endpoint devices and the orchestrator comprises a processor and a memory coupled to the processor that stores instructions that when executed by the one or more endpoint devices and the orchestrator, causes the one or more endpoint devices and the orchestrator to perform operations comprising:

establishing an internal peer-to-peer file sharing infrastructure exclusive to the edge compute environment using the one or more endpoint devices and the orchestrator, the internal peer-to-peer file sharing infrastructure using a torrent protocol, wherein the endpoint devices are air gapped from data processing systems external to the edge compute environment; and using the internal peer-to-peer file sharing infrastructure exclusive to the edge compute environment to configure one or more of the one or more endpoint devices to allow the one or more endpoint devices to provide one or more computer-implemented services to one or more users associated with the edge compute environment.

17. The edge compute environment of claim 16, wherein each of the one or more endpoint devices and the orchestrator are peers storing data being shared using the internal peer-to-peer file sharing infrastructure, and the data being torrent data associated with one or more torrent files.

18. The edge compute environment of claim 17, wherein the orchestrator comprises a torrent tracker that keeps track of data availability information associated with the data being shared using the internal peer-to-peer file sharing infrastructure.

19. The edge compute environment of claim 18, wherein only the orchestrator is able to communicate with the data processing systems external to the edge compute environment.

20. The edge compute environment of claim 19, wherein, within the internal peer-to-peer file sharing infrastructure exclusive to the edge compute environment, the orchestrator manages data retention instructions for the data being shared using the internal peer-to-peer file sharing infrastructure and causes one or more of the one or more endpoint devices to execute one or more of the data retention instructions.

* * * * *